United States Patent Office 3,214,403
Patented Oct. 26, 1965

3,214,403
THERMOSETTING COATING POWDERS FROM GUANAMINES AND EPOXY RESINS
Dwight E. Peerman, Minneapolis, Minn., assignor to General Mills, Inc., a corporation of Delaware
No Drawing. Filed Feb. 23, 1962, Ser. No. 175,331
24 Claims. (Cl. 260—37)

The present invention relates to thermosetting coating powders and to the process of using same. More particularly, it relates to such powders prepared from epoxy resins and certain guanamines and to the process of coating articles therewith.

Coatings on metallic articles are particularly desirable for protection from destructive solvents, chemicals, or corrosive agents, or when it is desired that the surfaces be electrically insulated or resistant to mechanical abrasion or frictional wear. Of course, articles to be coated may also be of nonmetallic materails such as glass, ceramics, wood, and the like. Dipping, spraying, brushing, and extrusion are the classical methods of applying coatings. All of these methods have certain drawbacks, many of which can be overcome by the use of a fluidized bed. Generally, said process involves the application of a coating by heating the article to a temperature above the melting point of the coating material and then dipping it into the fluidized bed. Particles which strike the substrate surface fuse and adhere. Some of the advantages of this process over the classical methods include: abiilty to coat complex shapes, easy regulation of coating thickness, efficient use of coating material, high coating rate, simple and inexpensive process equipment, smooth continuous coatings, elimination of the need for solvents, and ability to apply thick insulative coatings in one coat rather than multiple coats, on corners and edges as well as on flat and round surfaces.

A variety of coating materials have been used heretofore in the fluidized bed process. Thus, thermoplastic resins or materials such as polyethylene, linear polyamides (nylons), polystyrenes, acrylic resins, bitumen such as gilsonite or asphalt, shellac and wax have been used. It is also set forth in the prior art that certain thermosetting epoxy resins can be used as the coating materials in the fluidized bed process. However, the epoxy resin powders available commercially are those comprising a blend of dry curing agent (such as dicyandiamide, aromatic diamines, aromatic anhydrides, and $BF_3$ complexes) and powdered epoxy resin. These blends have certain disadvantages inherent in physical mixtures. Thus, the curing agents are present in an unreacted state which gives rise to corrosion problems in storage and shipment, a chance of loss of reactivity by uncontrolled reaction and potential toxicity. Furthermore, the physical blend of curing agent and epoxy resin has a tendency to classify during the coating operation or because of vibration during shipment. This tendency to classify is further aggravated when pigments, flow control, and anti-caking agents and the like are used in addition to the curing agent and epoxy resin. Also, liquid epoxy resins may not be used with the above-described curing agents since the liquid resin, even if blended with a solid resin, would cause fusing or caking making it impossible to apply the coating material as a dry powder. Additionally, some of the physical blends are sensitive to oxygen and/or moisture and thus the gas used in the fluidized bed must be nitrogen or dry air.

Accordingly, it is an object of the present invention to provide a novel thermosetting coating powder.

It is also an object of the present invention to provide such a powder from an epoxy resin, which overcomes the disadvantages of those used heretofore.

Another object of this invention is to provide such a powder from epoxy resins and certain guanamines.

Still another object of my invention is to provide a method of coating articles with a powder prepared from epoxy resins and certain guanamines.

Other objects and advantages of the invention will be apparent from the following detailed description.

It has now been found that excellent coating powders can be prepared from epoxy resins which have been partially reacted with certain guanamines. Said partially reacted or "B-staged" resin powders provide a homogeneous, single component, coating material which does not classify during the coating operation or because of vibration during shipment. Additionally, pigments and flow control and anti-caking agents can be incorporated therein either prior to, during, or after the "B-staging" of the epoxy resins and guanamines. If said agents are incorporated prior to or during the partial curing step, they will be thoroughly wet by the molten resin. Thus, even with added pigments or flow control and anti-caking agents, the powder will still be homogeneous and will have no tendency to classify during the coating operation or shipment. Colored coatings are desirable in some instances. Also, the flow control and anti-caking agents improve the powders by regulating the flow-out thereof on the article to be coated and by preventing caking of the powders when stored for any relatively long period of time. Particularly useful agents for the latter purposes are the synthetic amorphous silicas and natural silicates.

A further advantage of the present invention is that the epoxy resin and guanamine curing agent are already tied up in partial reaction thus limiting greatly the reactivity of the ingredients. Another advantage of the present invention is that dry, friable powders having unexpectedly low melting points can be prepared from mixtures of solid and liquid epoxy resins. This is true because the "B-staging" reaction, in which the guanamine is partially reacted with the epoxy, causes a rise in melting point of the resulting resin well above room temperature. Although these powders have melting points above room temperature, they are still low enough melting to coat items which have been preheated to a lower temperature than has been heretofore possible.

A wide variety of guanamines may be employed as curing agents in preparing the powders of the present invention. They may be represented by the following formulae:

(A)

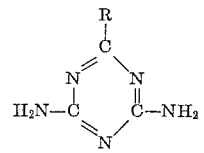

(B) 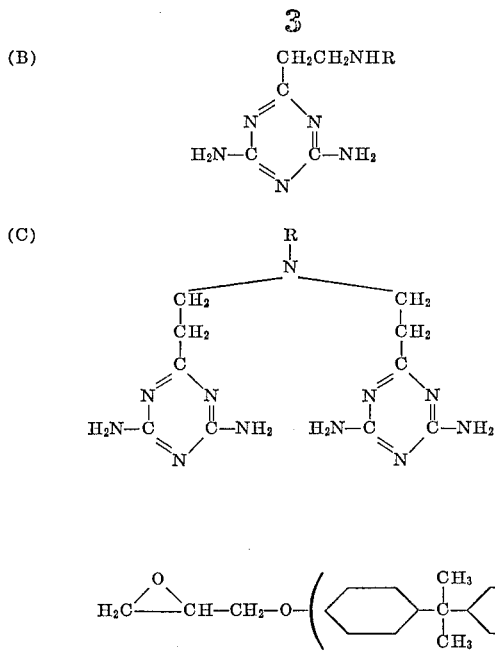

(C)

(D)

where R is an aliphatic hydrocarbon group containing from 4 to about 21, preferably 6 to 21, carbon atoms and $R_1$ is the hydrocarbon group of dimerized unsaturated fatty acids.

The foregoing guanamine compounds may be defined generally by the following formula:

$$(A)_xB$$

where A is the ring

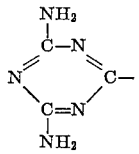

$x$ is a whole integer of 1 to 2 and B is selected from the group consisting of R, $RNHCH_2CH_2—$, $RN(CH_2CH_2—)_2$ and $R_1$ where R and $R_1$ have the meanings set forth above.

These guanamines are conveniently made from dicyandiamide and nitriles. Thus, the aliphatic substituted guanamines may be prepared from aliphatic nitriles such as those derived from fatty acids. Compound B may be made from the nitrile, $RNHCH_2CH_2CN$, which is the acrylonitrile adduct with the fatty amine $RNH_2$. Compound C may be made from the acrylonitrile diadduct of the fatty amine $RNH_2$, $RN(CH_2CH_2CN)_2$. Compound D may be made from the dinitrile prepared from dimerized fatty acids such as linoleic acid. Thus, the fatty guanamines may be prepared from the higher fatty acids containing from 5 to 22 carbon atoms, or the polymerized derivatives thereof, by converting the fatty acids to the nitriles and then reacting the nitriles with dicyandiamide. The fatty acid employed may be a single, isolated fatty acid or may be the mixed fatty acids from a fat or oil or any selected fraction of such fatty acids. Moreover, the fatty acids may be either saturated or unsaturated. In addition, it is understood that the term "fatty" as used herein is not intended to exclude the branch chain products having the same number of carbon atoms. Fatty guanamines derived from the $C_8$ to $C_{18}$ acids of coconut oil are referred to as cocoguanamines.

Various methods of preparing the above-described guanamines are known in the art. Thus, see the following U.S. patents: 2,447,175; 2,459,397; 2,606,904; 2,684,-366; 2,777,848; 2,792,395; and 2,900,367.

Suitable epoxy resins for preparing the coating powders of the present invention include the reaction products of polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldeyde, acetone, methyl ethyl ketone, and the like. A typical epoxy resin of this type is the reaction product of epichlorohydrin and 2,2-bis(p-hydroxyphenyl) propane (Bisphenol A), the resin having the following theoretical structural formula:

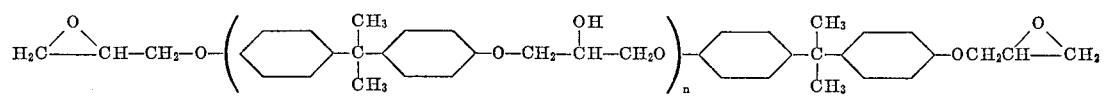

where $n$ is 0 or an integer up to 10. Generally speaking, $n$ will usually be no greater than 3 or 4, and may be 1 or less. However, other types of epoxy resins may be employed.

Another of such epoxy resins are those which are the reaction product of epichlorohydrin and bis(p-hydroxyphenyl)sulfone. Still another group of epoxy compounds which may be employed are the glycidyl esters of polymeric fat acids. These glycidyl esters are obtained by reacting the polymeric fat acids with polyfunctional halohydrins such as epichlorohydrins. In addition, the glycidyl esters are also commercially available epoxide materials. As the polymeric fat acids are composed largely of dimeric acids, the glycidyl esters thereof may be represented by the following theoretical, idealized formula:

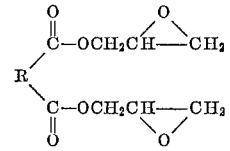

where R is the divalent hydrocarbon radical of dimerized unsaturated fatty acids.

The polymeric fat acids are well known materials, commercially available, which are the products prepared from the polymerization of unsaturated fatty acids to provide a mixture of dibasic and higher polymeric fat acids. The polymeric fat acids are those resulting from the polymerization of the drying or semi-drying oils or the free acids or the simple aliphatic alcohol esters of such acids. Suitable drying or semi-drying oils include soybean, linseed, tung, perilla, oiticica, cottonseed, corn, sunflower, safflower, dehydrated castor oil, and the like. The term "polymeric fat acids," as used herein and as understood in the art, is intended to include the polymerized mixture of acids which usually contain a predominant portion of dimer acids, a small quantity of trimer and higher polymeric fat acids and some residual monomers.

In general, the most readily available naturally occurring polyunsaturated acid available in large quantities is linoleic. Accordingly, it should be appreciated that polymeric fat acids will as a practical matter result from fatty acid mixtures that contain a preponderance of linoleic acid and will thus generally be composed largely of dimerized linoleic acid. However, polymerized fatty acids may be prepared from the naturally occurring fatty acids having from 6 to 22 carbon atoms. Illustrative thereof are oleic, linolenic, palmitoleic, and the like. Glycidyl esters of other polybasic acids, such as phthalic and sebacic acids, may be employed.

Other types of epoxy resins which may be used to prepare the coating powders of the present invention and which are commercially available epoxy materials are the polyglycidyl ethers of tetraphenols which have two hydroxy aryl groups at each end of an aliphatic chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha,alpha, omega,omega-tetrakis(hydroxyphenyl) alkanes, such as 1,1,2,2-tetrakis(hydroxyphenyl) ethane, 1,1,4,4-tetrakis-(hydroxyphenyl)butane, 1,1,4,4-tetrakis(hydroxyphenyl)-2-ethylbutane and the like. The epoxy resin reaction product of epichlorohydrin and tetraphenol may be represented by the following theoretical structural formula:

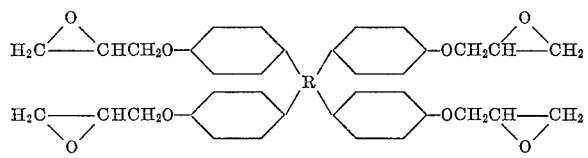

where R is a tetravalent aliphatic hydrocarbon chain having from 2 to 10, and preferably, from 2 to 6 carbon atoms.

Still another group of epoxide materials are the epoxidized novolac resins. Such resins are well known substances and readily available commercially. The resins may be represented by the following theoretical, idealized formula:

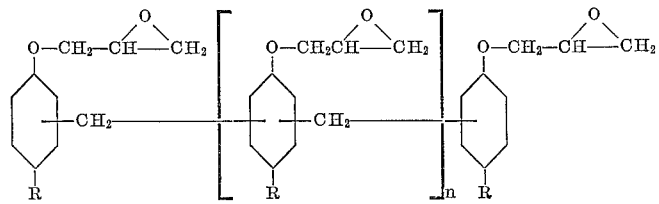

where R is selected from the group consisting of hydrogen and alkyl groups having up to 18 carbon atoms, and $n$ is an integer of from 1 to 10.   Generally, $n$ will be an integer in excess of 1 to about 5.

In general, these resins are obtained by epoxidation of the well-known novolac resins. The novolac resins, as is known in the art, are produced by condensing the phenol with an aldehyde in the presence of an acid catalyst. Although novolac resins from other aldehydes such as, for example, acetaldehyde, chloral, butyraldehyde, furfural, and the like, may also be used. The alkyl group, if present, may have a straight or a branched chain. Illustrative of the alkylphenol from which the novolac resins may be derived are cresol, butylphenol, tertiary butylphenol, tertiary amylphenol, hexylphenol, 2-ethylhexylphenol, nonylphenol, decylphenol, dodecylphenol, and the like. It is generally preferred, but not essential, that the alkyl substituent be linked to the para carbon atom of the parent phenolic nucleus. However, novolac resins in which the alkyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be used to prepare the coating powders of the present invention are epoxidized olefins, such as epoxidized polybutadiene and epoxidized cyclohexenes, and the diglycidyl ethers of the polyalkylene glycols. These latter ethers are readily available commercially and may be represented by the following theoretical, idealized formula:

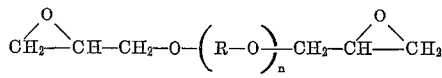

where R is an alkylene radical having from 2–5 carbon atoms and $n$ is an integer of from about 1 to about 50. R is preferably ethylene or propylene or mixtures thereof and $n$ is preferably about 3 to about 10. It is understood that $n$ represents an average figure since the ethers are often prepared from a mixture of glycols—i.e., tripropylene glycol, tetrapropylene glycol, and the like. Said epoxy resins may be prepared in the manner set forth in U.S. Patent 2,923,696.

In general, the epoxy resins may be described as those having terminal epoxide groups.

In addition, the epoxy resins may be characterized further by reference to their epoxy equivalent weight the epoxy equivalent weight of pure epoxy resin being the mean molecular weight of the resins divided by the mean number of epoxy radicals per molecule, or in any case, the number of grams of epoxy equivalent to one epoxy group or one gram equivalent of epoxide. The epoxy resinous materials employed in this invention have epoxy equivalent weights of from about 140 to about 2000.

While all of the above-described fatty guanamines and epoxy resins are suitable for the preparation of the thermosetting coating powders of the present invention, it is preferred to use the monoalkyl fatty guanamines having the Formula A and the epoxy resins prepared from epichlorohydrin and polyhydric phenols such as Bisphenol A and the tetraphenols. Additionally, mixtures of epoxies of the same or different types may be used. It is understood that the properties of the coating powders will vary somewhat depending upon the particular epoxy resin and fatty guanamine used. For example, powders prepared from fatty guanamines of the Formula A and the epoxy novolacs have high heat resistance while those prepared from said guanamines and the diglycidyl ethers of polyalkylene glycols have good flexibility. And by using an epoxy prepared from epichlorohydrin and Bisphenol A in combination with either of the latter-described epoxies, a powder can be prepared which has the basic properties of the Bisphenol A type epoxy, but which will provide coatings having improved heat resistance and/or flexibility.

The fatty guanamine is used in an amount sufficient to cure the epoxy resin to an insoluble and infusible polymer. Generally, said guanamines are used in ratios by weight curing agent to epoxy resin of from about 5:95 to 75:25 and preferably from about 10:90 to 25:75. It is particularly preferred to use a ratio of 15:85.

As indicated previously, the powders of the present invention preferably also contain a flow control and anti-caking agent. Examples of such agents include amorphous silicas, dehydrated silica gels, various natural silicates such as attapulgite and kaolin clays, amorphous alumina, talc, and finely divided calcium carbonate. It is preferred to use amorphous silicas such as the commercially available Santocel C, Cab-O-Sil M–5, and Syloid 72. Particularly good results are obtained with Syloid 72. Thus, coating powders containing said agent have not only good flow-out on melting with heat and do not cake even when held at relatively high temperatures for long periods, but also provide smooth, glossy coatings. The described agents are used in an amount sufficient to improve the flow-out of the powder on melting with heat and/or to prevent fusing or caking of the powder at high ambient temperatures, i.e., 125° F. Obviously, the amounts of said agents will vary considerably, depending on the particular agent used and the result desired. Generally, said agents will be used in amounts of about 2 to 50% by weight based on the weight of the epoxy resin and the fatty guanamine. The amorphous silicas are preferably used in amounts of about 2 to 15% by weight. Larger amounts of the clays are preferred, such as about 30 to 50% by weight.

The coating powders of the present invention may also contain colorants, pigments, or fillers. Said agents must be heat resistant since the fluidized powders are fused and cured at elevated temperatures of from about 200 to 400° F. Examples of suitable pigments include titanium dioxide (white finish), lead chromate (yellow), light and medium chrome yellow, chromium oxide (green), ultramarine blue, red iron oxide, and toluidine red. The amounts of said pigments can be varied widely to give different shades of different colors. Additionally, mixtures of different pigments may be used. Generally, said pigments are used in amounts of about 1 to 15% by weight based on the weight of the epoxy resin and fatty guanamine. The preferred amounts of the various pigments are as follows: 10% of the yellows; 10–12% of chromium oxide; 10% titanium dioxide; 8% red iron oxide, and 3% toluidine red. It is to be understood that any heat resistant pigment or colorant can be used and that the type thereof will vary with the color desired.

By "B stage" resin is meant a partially reacted product which will undergo little or no physical change during extended storage at ambient room temperatures and in which the reactants are homogeneously compatible in a one component, stable compound ready for final curing at elevated temperatures.

A "B stage" resin can generally be described as a partially reacted composition which is stable for extended periods of time, but is capable of being quickly cured at elevated temperatures. The epoxy-fatty quanamine compositions may be described as proceeding through three stages, A, B, and C.

The "A stage" is a simple blend or mixture of epoxy resin and guanamine in which essentially no reaction has taken place. Such a simple blend or mixture will be stable for great lengths of time, but may or may not be homogeneous.

The "B stage" is the same resin composition which has been partially reacted or cured and is quite stable for extended periods of time. The "B stage" resin can be further reacted at elevated temperatures to yield the finally cured stage, the "C stage," which is an infusible and insoluble polymer.

The "A stage" mixture may, of course, be cured at elevated temperatures to provide an infusible, insoluble polymer. However, much longer times for curing are required and the physical blend of epoxy resin and guanamine curing agent may have a tendency to classify during the coating operation and shipment.

The use of the "B stage" resin allows for rapid curing and still provides a stable starting material which does not classify and in which the reactants are already tied up in partial reaction.

The "B stage" epoxy resin-fatty guanamine coating powders of my invention are prepared by heating a mixture of the epoxy resin and the guanamine to effect partial reaction and stopping such reaction before the "C stage" is reached. This partial reaction can be effected at various temperatures. At higher temperatures, the time of heating becomes short for producing the "B stage" resin and care must be taken that the time is not sufficiently extended so as to result in the "C stage." At lower temperatures, the heating period is slightly longer and more control can be exercised. As a practical matter, the epoxy resin-guanamine system will generally be "B staged" at temperatures in the range of 100 to 210° C. Temperatures outside this range may be used, however, although such may present some problems. For example, at temperatures above 210° C., the time of heating is so short that it is difficult to prevent advancement of the cure to the "C stage" or fully cured state. At temperatures below 100° C., the time of heating is so prolonged as to be impractical or uneconomical. A common temperature used in practice is about 150° C., at which temperature the heating period is sufficiently long to allow for control over the reaction and yet is not an impractical or uneconomical length of time.

As the temperature and period of heating will vary somewhat dependent on the particular epoxy resin, the particular guanamine and proportions thereof, some means of indicating when the "B stage" resin is reached had to be devised. It is, of course, most important that the reaction not be carried out to the point where gelation occurs. One means of preventing gelation, which can be used during the heating period, is the observance of the viscosity of the product. Another is to determine the oxirane oxygen content periodically and observe the rate of change thereof.

In observing the viscosity during heating, it will be noted that very little change occurs during the initial heating period. As heating is continued, the rate of change in viscosity begins to increase somewhat and just prior to gelation the rate increases very rapidly. When this rate increases greatly, the heating must be stopped quickly and the product cooled for gelation would occur in a brief time, a few minutes. The viscosity may be observed during the course of the reaction or first conducted on a small scale to obtain some indication of the approximate time of heating.

In the oxirane oxygen test, samples are withdrawn periodically and the oxirane oxygen content determined by titration with HBr in acetic acid. Since HBr titrates both the oxirane oxygen of the epoxy resin and the amine of the guanamine, a value is obtained representing the total of these two. The amine contribution remains constant since primary amines continue to titrate even after reaction with oxirane oxygen. Thus, any decrease in titration results may be attributed to the disappearance of oxirane oxygen. Again the rate of change of oxirane oxygen content is low at first, begins to increase somewhat as the reaction proceeds, and then increases quite rapidly. As the rate becomes rapid, the gelation point is close at hand and the reaction is stopped.

Use of both viscosity measurement and the oxirane oxygen test in determining the extent of partial curing is illustrated in the examples to follow.

Thus, the "B stage" resins may be prepared by heating the mixture if components at a temperature sufficient to effect partial reaction, for example, at about 100 to 210° C., and preferably at 140 to 170° C. Thereafter, the heating should be stopped and the reaction mixture should be cooled before final curing occurs so that a partially cured resin results. The termination point may be determined by observation of the viscosity and oxirane oxygen content. In general, a "B stage" resin will exist when the reaction is from about 5 to 90% complete based on the disappearance of oxirane oxygen. As a practical matter, the preferred "B stage" resins are those in which the reaction is about 15 to 50% complete, the most desirable being about 25 to 40% complete.

As indicated hereinabove the flow control and anti-caking agents and pigments or colorants may be added prior to, during, or after the "B staging" reaction. If added prior to or during the partial curing, the resin, in the molten state, thoroughly wets the dry ingredients. This is advantageous since subsequent grinding, fluidizing, or shipping will not classify the ingredients. Also, coatings prepared from such powders have higher gloss than is obtainable in powders in which the powdered "B stage" resin is mixed with finely divided pigments and anti-caking and flow control agents. However, said agents can be added after the "B staging" reaction to provide powders having excellent properties.

After the above-described partial reaction, the "B stage" resin, with or without the added flow control and anti-caking agents and/or pigments, is broken up into small pieces and ground to a small particle size by any suitable method such as with a Micro-Pulverizer. In order to obtain smooth, glossy coatings of even film thickness, the coating powders should be of relatively uniform particle size. Thus, if the powders contain large amounts of fines or coarse particles, the coatings prepared therefrom will not be of uniform thickness. It has been found that good results are obtained when the powders of the present invention have the largest percentage of particles in the size range of 50–200 microns. Powders having a particle size range of 75–150 microns are especially preferred.

The coating powders are preferably applied to the articles to be coated by the use of a fluidized bed. A fluidized bed is a mass of solid particles which exhibits the liquid-like characteristics of mobility, hydrostatic pressure, and an observable upper free surface or boundary zone across which a marked change in concentration of particles occurs. Alternatively, the fluidized bed may be termed a "dense phase" having an upper free surface. These definitions are found in an article entitled "Fluidization Nomenclature and Symbols" appearing at pages 1249 and 1250 in "Industrial and Engineering Chemistry," volume 41, Number 6, June 1949. It is formed by introducing an ascending current of gas into the coating material under pressure, the bed being maintained in the fluidized state by controlling the flow of the gas. An article to be coated is ordinarily heated and then immersed, at least partially, into the fluidized bed of the coating material. Individual particles of the coating material adhere and melt, thus fusing together with other particles on the hot surface of the immersed portion of the article to form a continuous coating thereon.

Any suitable apparatus may be used to fluidize the epoxy-fatty guanamine coating powders. One such apparatus is the "Vibro-Fluidizer," manufactured by Armstrong Resins, Inc., of Warsaw, Indiana. Another is that described in U.S. Patent 2,844,489.

Any gas which is reasonably inert at the temperatures and with the materials employed may be used as the gaseous medium for fluidizing the coating powders of the invention. Air is the preferred gas for reasons of economy (the "B stage" coating powders of this invention are not sensitive to either oxygen or moisture). However, other gases, such as nitrogen, may be used. The pressure of the gas may vary greatly, depending on the particular shape and dimensions of the treating tank as well as on the particular coating powder used. The gas is preferably maintained at ambient temperatures. Higher or lower temperatures can be used, however, if desired.

The heating of the article should be to a temperature above the melting point of the coating powder. By "melting point" is here meant that stage wherein the powder is sufficiently coalesced to provide a continuous coating of the article. Temperatures as low as 95° C. can be used with some of the coating powders of the invention. There is no definite upper limit, although the articles should not be heated so high as to cause degradation of the coating material or excessive run-off. Prior to the preheating, the surface of the article may be roughened, cleaned, and/or degreased to obtain better adhesion of the coating to the article.

The period of immersion of the article in the fluidized bed may vary within relatively wide limits depending upon the thickness of the coating desired, the size and heat capacity of the article to be coated, the temperature to which the article is preheated, and the particular coating powder used. The time of immersion may thus vary from a fraction of a second up to a minute or more. Generally, the time of immersion is about 1 to 15 seconds with the preferred time being about 3 to 10 seconds.

After the above-described preheating and immersion, the article is removed from the fluidized bed and placed in an oven to complete the cure of the thermosetting coating thereon. Again, the cure time and temperature may vary over wide limits. At higher temperatures, the coating will be cured in a lesser amount of time. Generally, the article will be kept in the oven at a temperature and for a sufficient length of time to produce an infusible, insoluble coating thereon. Oven temperatures of from about 100° to 400° C. and higher may be used and the curing period may vary from a few minutes to several hours.

Instead of heating the article prior to immersion in the fluidized bed, other means can be employed to cause the powder to adhere to the articles. One such method is to pre-coat the article with a primer such as cyclohexanol or a sticky resin. Upon immersion in the fluidized bed, the "B staged" resin particles strike the primed surface of the article and adhere. Subsequent curing in an oven will vaporize primers such as cyclohexanol leaving a primer-free coating of the cured epoxy resin. Another such method is electrostatic deposition. In this case the article to be coated is given an electrical charge which causes the resin particles to adhere to the surface of the article. The charge is maintained until the coated article is placed in the curing-oven and the particles fuse. It may be advantageous to use the above procedures where the articles cannot be preheated to high temperatures. However, in such instances, the "B staged" epoxy resin-fatty guanamine powder would have to have a fairly low cure temperature. Said procedures have certain disadvantages. Thus, when a primer is used, it may not be removed completely upon subsequent oven-curing of the coating and, therefore, the coating may not be as good as when no primer is used. Also, the above methods require additional materials and apparatus. Therefore, it is preferred to preheat the article prior to immersion in the fluidized bed.

This invention is not limited to the application of the "B staged" powder by the use of a fluidized bed. Thus, in certain cases such as when the articles are too bulky to be immersed in the fluidized bed or when it is desired to coat materials which are part of a permanent structure such as bridges, buildings and the like, the powder may be applied in the form of a fine spray or dispersion in any gaseous medium. Air is entirely suitable as the gaseous medium since, as indicated hereinabove, the "B stage" coating powders of this invention are not sensitive to either oxygen or moisture. The powder can be atomized or dispersed in the gaseous medium by the use of any apparatus or method adapted for such purpose. A particularly suitable apparatus is a flocking gun which is commercially available. One such apparatus is a "Model 171" flocking gun available from Binks Manufacturing Co., Chicago, Illinois. When using the above apparatus and method, the articles or structures to be coated can be preheated, primed, subjected to an electrostatic charge or the like and then sprayed with the powder. After a sufficient amount of the powder has adhered to the articles, the spraying is stopped and the article or structure is subjected to a heat treatment to cure the coating. The heat for the curing may be supplied by a heat lamp or lamps for example. While the above procedure can be used to coat articles of any size or shape, its main value lies in coating bulky articles or materials comprising parts of permanent structures. It is preferred to coat smaller articles in the fluidized bed since it is easier to obtain uniform coatings and the curing thereof can be carried out in ovens.

The following reactants were used in the preparation of the coating powders of the examples which follow, said examples serving to further illustrate the invention:

*Epoxy resin A.*—A condensation product of Bisphenol A and epichlorohydrin having an epoxy equivalent weight of about 190.

*Epoxy resins A–1, A–2, A–3, and A–4.*—The same as "A" except that the condensation products have epoxy equivalent weights of about 315, 525, 925 and 1800, respectively.

*Epoxy resin B.*—Diglycidyl esters of dimerized vegetable oil acids having an epoxy equivalent weight of 420.

*Epoxy resin C.*—A diglycidyl ether of a polyalkylene glycol of the general formula set forth hereinabove wherein R is propylene and $n$ is about 9. Said resin has an epoxy equivalent weight of about 330 and a viscosity of 88 centipoises at 25° C.

*Guanamine A.*—A cocoguanamine of the general Formula A set forth hereinabove wherein $R_1$ is a $C_{11}$ alkyl group. Said guanamine was prepared from dicyandiamide and a $C_{12}$ nitrile, the latter being derived from the $C_{12}$ fraction of coconut oil acids.

*Guanamine B.*—The same as guanamine A, except that nitrile used in the preparation thereof was derived from the mixture of $C_8$ to $C_{18}$ acids of coconut oil.

In the examples to follow, all parts are by weight, unless otherwise indicated. Also, the apparatus used to fluidize the powders in all of the examples was a "Vibro-Fluidizer."

EXAMPLE I

To 100 parts of epoxy resin A–2 were added 6.5 parts of guanamine A. This mixture was "B staged" at 150° C. for 40 minutes and then the viscous resin was quickly cooled. The clear, light amber product had a melting point of 84° C. The solid resin was pulverized so that a majority of the particles were in the size range of 80–170 microns. Steel probes (¼ inch round and 4 inches long), cut from cold rolled steel, were preheated to 150° C. and then immersed in the dense phase of the fluidized coating powder for six seconds. The probes were removed from the bed and cured in an oven at 150° C. for 70 minutes. After cooling, the coated specimens were immersed in toluene, trichloroethylene, acetone, and 5% acetic acid for three days. The coating was softened by toluene, trichloroethylene, and acetone, but remained hard in 5% acetic acid.

EXAMPLE II

To a blend of 50 parts of epoxy resin A and 50 parts of epoxy resin A–3 was added 10.5 parts of guanamine A. This mixture was "B staged" at 150° C. for 40 minutes during which time the viscosity at 150° C. increased from 140 to 620 centipoises. The cooled, clear amber resin had a melting point of 58° C. The resin was pulverized to the same particle size as the resin of Example I, fluidized, and then steel probes, preheated to 120° C., were immersed in the dense phase of the coating material for five seconds. The probes were removed from the bed, cured in an oven for 90 minutes at 150° C., and immersed for three days in the same solvents as set forth in Example I. The coating of this example remained hard in acetone and 5% acetic acid and was only slightly softened in toluene and trichloroethylene.

The data of Examples I and II show that good fluidized bed coating powders can be prepared from solid epoxies (Example I) or mixtures of solid and liquid epoxides (Example II). The latter powders have superior solvent resistance and have unexpectedly low melting points— i.e., the blended epoxy of Example II had an average epoxy equivalent weight of 557 which was higher than the 525 of the solid epoxy of Example I, yet the "B staged" resin prepared therefrom had a melting point of 58° C. compared to 84° C. for the resin of Example I. This low melting point is particularly advantageous where the articles to be coated cannot be heated to high temperatures. The powder of Example II has been successfully applied to articles which have been preheated to temperatures as low as 95° C.

EXAMPLE III

A blend of 300 parts of epoxy resin A, 900 parts of epoxy resin A–3, and 84 parts of guanamide A was heated at 150° C. for 39 minutes at which point the resin had a viscosity of 3,840 centipoises at 150° C. The cooled resin had an apparent oxirane oxygen content of 2.8% and a melting point of 83° C. The resin was pulverized as in Examples I and II and then a steel panel (3 inches x 5 inches x .010 inch), preheated to 150° C., was immersed in the dense phase of the fluidized powder for 10 seconds. After curing, the coating on the steel panel was glossy with good coverage. It had an extensibility of greater than 5% (measured on the General Electric impact tester) on a film which was 8 to 10 thousandths of an inch in thickness.

EXAMPLE IV

To a blend of 615 parts of epoxy resin A and 615 parts of epoxy resin A–3 was added 160 parts of guanamine B. The mixture was "B staged" at 150° C. for a period of 40 minutes during which the viscosity of the resin at 150° C. increased from 120 to 652 centipoises. At the end of this period, the resin was quickly cooled, broken up into small pieces, and ground so that the majority of the particles were in the size range of 75–150 microns. A steel panel was preheated to 150° C. and immersed in the dense phase of the fluidized coating powder for 10 seconds. The resulting coating, after curing in an oven at 150° C., was glossy and hard.

EXAMPLE V

Fifty parts of epoxy resin A, 50 parts of epoxy resin A–3, and 8.6 parts of guanamine A were blended and "B staged" at 150° C. for 70 minutes. The product was cooled, and ground so that the majority of the particles thereof were in the size range of 75–150 microns. The powder had good flow properties and the coating characteristics thereof were also good.

EXAMPLE VI

To 95 parts of epoxy resin A–3 were added 5 parts of guanamine A. This mixture was partially reacted at 150° C. for 135 minutes, cooled quickly, and ground to a uniform size. Coatings on steel panels had substantially the same characteristics as those of Example IV.

EXAMPLE VII

Ninety-five parts of epoxy resin A–4 and 5 parts of guanamine A were "B staged" at 150° C. for 150 minutes. The product was cooled, finely divided, and then screened through a 70 mesh screen. The powder was free flowing and produced a coating on steel which was fairly smooth and hard.

Examples III–VII show that good fluidized bed powders can be prepared by "B staging" various guanamines and epoxy resins at varying weight ratios. Thus, Example III shows that the weight ratios of the solid and liquid epoxies can be varied and still produce an unexpectedly low melting point powder; Example IV shows that such a powder can be prepared from other guanamines; Example V shows that the amount of guanamine in relation to the mixture of solid and liquid epoxies can be varied; and Examples VI and VII show that good powders can be prepared from solid epoxies of high epoxy equivalent weight and from a relatively small amount of the fatty guanamine.

As set forth hereinabove, the flow-out and caking resistance of the thermosetting powders can be improved by the addition of various agents. This is shown by the following examples.

EXAMPLES VIII–XXII

Several different anti-caking and flow control agents were intimately blended with the fluidized bed coating powder of Example II. Steel probes, preheated to 150° C., were dipped into the dense phase of the resulting fluidized bed coating powders containing said agents. The particular agent, amount thereof, flow-out properties, coating smoothness, and caking resistance of said powders are set forth in the following Table I.

EXAMPLE XXIV

Ninety grams of the fluidizing powder of Example IV were milled with 10 grams of titanium dioxide and one gram of ultarmarine blue. Steel panels were coated in Table I

| Example | Flow Control and Anti-Caking Agent | Wt. Percent | Flow-Out | | Coating Smoothness | | Caking Resistance [2] (122° F.) |
|---|---|---|---|---|---|---|---|
| | | | Dip Time (Sec.) | Rating [1] (Sec.) | Dip Time | Rating | |
| II | None | | | 5 | Good | 5 | Good | Fused at 72° F. |
| VIII | Santocel "C" [3] | 2 | | 5 | do | 5 | do | 17 hours, caked. |
| IX | do | 3 | | 5 | do | 5 | Fair | Do. |
| X | do | 4 | { | 5 | Fair | 5 | Poor | } 17 hours, slight caking. |
| | | | | 10 | Good | 10 | Good | |
| XI | Cab-O-Sil "M-5" [4] | 2 | | 5 | do | 5 | Fair | 3 hours, fused. |
| XII | do | 4 | | 5 | Poor | 5 | Poor | 3 hours, caked. |
| XIII | Talc | 5 | | 3 | Good | 3 | Good | 1½ hours, caked. |
| XIV | do | 10 | | 3 | do | 3 | do | 1 hour, caked. |
| XV | Surfex "M.M." [5] | 5 | | 3 | do | 3 | do | 1½ hours, caked. |
| XVI | do | 10 | | 3 | do | 3 | do | 1 hour, caked. |
| XVII | A.S.P. "105" [6] | 5 | | 3 | do | 3 | do | 15 hours, caked. |
| XVIII | do | 10 | | 3 | Fair | 3 | Poor | 18 hours, no caking. |
| XIX | Attacote "C" [7] | 3 | | 3 | Good | 3 | Good | 15 hours, caked. |
| XX | do | 5 | | 3 | do | 3 | do | 18 hours, slight caking. |
| XXI | Alon "C" [8] | 4-8 | | 3 | do | 3 | do | All caked. |
| XXII | Syloid "72" [9] | 7-8 | | 3 | do | 3 | Excellent | 16 hours, slight caking. |

[1] Flow-out was rated as follows:
Good—Smooth coating with no unfused particles or waves or bumps noticeable in the film.
Fair—Coating with waves or bumps but no unfused particles visible in the film.
Poor—Coating with grainy or sandy appearance in the film.
[2] The powders were tested for caking by storing 50 grams of the powder at 122° F. in a closed 4 ounce wide mouth jar. If the powder remains free flowing, it is designated as non-caking at 122° F. If there are lumps which break up by rapping the jar a few times against the palm of the hand, the powder is designated as caking slightly. If the lumps do not break up readily, the powder is designated as caked.
[3] A commercially available amorphous silica manufactured by Monsanto Chemical Company having the following properties:
Silica (as $SiO_2$) _____ 89.5–91.5%.
pH _____ 3.5–4.0.
Particle size _____ 3–5 microns in diameter.
Bulk density _____ 6 lbs./cu. ft.
[4] A commercially available amorphous silica manufactured by Godfrey L. Cabot, Inc., having the following properties:
Silica (as $SiO_2$) ___ 99.0–99.7%.
pH _____ 3.5–4.0.
Particle size _____ 0.015–0.020 microns in diameter.
Bulk density _____ 2.5–3.5 lbs./cu. ft.

[5] A precipitated and micro-milled calcium carbonate manufactured by Diamond Alkali Co. It has a bulk density of 50–55 lb./cu. ft. and an average particle size of 1–5 microns.
[6] Surface modified aluminum silicate manufactured by Minerals and Chemicals Corporation of America having the following properties:
pH _____ 6.3.
Particle size _____ 0.55 microns (average).
Bulk value _____ 21.5 lb./gal.
[7] Treated attapulgus clay, available commercially from Minerals and Chemicals Corporation of America, having the following properties:
pH _____ 5.5.
Particle size _____ 8 microns (average).
Bulk density _____ 16 lb./cu. ft.
[8] Amorphous alumina manufactured by Godfrey L. Cabot, Inc.
[9] A commercially available amorphous silica manufactured by Davison Chemical Company (Division of W. R. Grace and Co.) having the following properties:
Silica (as $SiO_2$) _____ 98% min.
pH _____ 6–8.
Particle size _____ 3–5 microns in diameter.
Bulk density _____ 8.9 lbs./cu. ft.

The data of Table I show that a variety of agents improve the flow-out and/or caking resistance of the "B staged" epoxy-fatty guanamine fluidized bed powders. Syloid 72 not only gave good flow-out properties and caking resistance to the powder, but also produced excellent coatings which were of uniform thickness, glossy, and smooth.

EXAMPLE XXIII

Four hundred forty-two parts of epoxy resin A and 442 parts of epoxy resin A–3 were melted together and then mixed with 116 parts of guanamine A and 40 parts of Cab-O-Sil M–5. The resulting blend was "B staged" at 150° C. for 40 minutes at the end of which period the reaction product had a viscosity of 5,800 centipoises at 150° C. Upon cooling, the product was found to have a melting point of 93° C. and an oxirane oxygen content of 3.3%. Pulverization of the resin resulted in a powder which was free flowing at room temperature and did not cake at 100° F., but caked at 122° F. This example demonstrates that the flow control and anti-caking agents can be incorporated during the "B staging" reaction to provide a free flowing powder with good caking resistance. Incorporation of the silica prior to the "B staging" gives a product having a higher viscosity and melting point than corresponding products containing no silica (see Example II). Coatings prepared from the powder of this example are smoother and have a higher gloss than corresponding coatings prepared from powders in which the silica is incorporated after the "B staging."

As set forth above, pigments may also be added to the coating powders of the present invention. This is demonstrated by the following example.

the same manner as set forth in Example IV. The coatings were glossy and had a uniform color.

Various mixtures of epoxy resins can be used in the preparation of the powders to provide coatings having increased impact resistance, greater extensibility, and so forth. This is shown by the following examples.

EXAMPLE XXV

To a blend of 980 parts of epoxy resin A–3, 210 parts of epoxy resin A, and 112 parts of epoxy resin C were added 98 parts of guanamine A. This blend was "B staged" for 75 minutes at 150° C. during which period the viscosity of the resin increased from 700 to 6000 centipoises at 150° C. The cooled product had an oxirane oxygen content of 2.15% and a melting point of 84° C. The resin was finely divided so that it would pass through a 70 mesh screen and then 2% by weight of Santocel "C" was added to the ground product with blending. Steel panels, preheated to 150° C., were dipped into the dense phase of the fluidized powder, removed, and cured in an oven at 150° C. for 150 minutes. The resulting coatings were excellent, being smooth, of uniform thickness, and glossy. The coatings on 10 mil steel passed the bend test on ⅛" mandrel and could be bent double many times without rupturing the film. Extensibility was also good. Thus, 5 mil films had an extensibility of 2 to 5% and a 4 to 5 mil film had an extensibility of 5 to 10%. The fluidizing powder had good flow-out properties and did not cake after 3 hours in an oven at 122° F.

Table II

To 1192 parts of a blend of equal parts by weight of epoxy resin A and epoxy resin A–3 were added 119 parts of epoxy resin C and 89 parts of guanamine A. This mixture was "B staged" at 150° C. for 74 minutes, the viscosity of the reaction mixture being measured at various intervals as set forth in the following Table II.

TABLE II

| Time (minutes): | Viscosity at 150° C. (centipoises) |
|---|---|
| 0 | 120 |
| 10 | 140 |
| 20 | 180 |
| 30 | 220 |
| 40 | 320 |
| 45 | 350 |
| 50 | 450 |
| 55 | 550 |
| 60 | 670 |
| 65 | 870 |
| 70 | 1000 |
| 74 | 1580 |

The above data show that the viscosity increased slowly at first and then more rapidly. In order to prevent gellation, the product was cooled quickly to 30° C. after 74 minutes at 150° C. The product had a capillary melting point of 48–62° C. and an oxirane oxygen content of 3.57%. A mixture of the "B staged" resin and 7% by weight of Syloid "72" was ground to a fine powder. This powder, applied to steel (preheated to 150° C.) from a fluidized bed, produced a smooth coating with high gloss. The cured coating had excellent flexibility, passing the ⅛ inch mandrel bend test, and showed 10–20% extension on the General Electric impact scale.

EXAMPLE XXVII

To 39.7 parts of epoxy resin A, 45 parts of epoxy resin A–3, and 5.4 parts of epoxy resin C were added 9.9 parts of guanamine A. This mixture was "B staged" at 152° C. until the resin had a viscosity of 1350 centipoises at that temperature and an oxirane oxygen content of 3.35%. The cooled product had a melting point of 80° C. The product was finely divided in a Micropulverizer and 4% by weight of Cab-O-Sil "M–5" was blended into the ground resin. This powder gave a coating on steel which had a General Electric extensibility of 0.5–1% on a ten mil film.

EXAMPLE XXVIII

A blend of 72 parts of epoxy resin A–3, 18 parts of epoxy resin C, and 10 parts of guanamine A was "B staged" at 150° C. for 39 minutes at which point the reaction product had a viscosity of 740 centipoises and an oxirane oxygen content of 1.7%. The cooled product had a melting point of 81° C. The resinous product was pulverized to a finely divided state, blended with 2% of Santocel "C," and then used to coat steel which had been preheated to 177° C. The coating had good flexibility since the steel panel could be bent repeatedly without breaking the film.

EXAMPLE XXIX

Five hundred sixty five parts of epoxy resin A, 565 parts of epoxy resin A–3, and 100 parts of epoxy resin B were blended with 160 parts of guanamine B. The blend was "B staged" at 150° C. for 45 minutes during which the viscosity thereof increased from 120 to 630 centipoises at 150° C. The cooled resin, which had an oxirane oxygen content of 2.9%, was broken up into ¼ inch pieces and 4% by weight of Santocel "C" added. After grinding to a finely divided state, the powder was used to coat steel giving a smooth hard coating when cured for 30 minutes at 177° C.

EXAMPLE XXX

To a blend of 530 parts of epoxy resin A, 600 parts of epoxy resin A–3, 35 parts of epoxy resin A–1, and 35 parts of epoxy resin B were added 132 parts of guanamine A. The mixture was "B staged" at 150° C. for 55 minutes at which point the viscosity had reached 1800 centipoises at 150° C. The product was cooled, ground, and applied to steel, preheated to 150° C. The resulting coating, after curing, was flexible and had high gloss. It had a General Electric extensibility of greater than 10% on a 9 mil film.

EXAMPLE XXXI

A blend of 530 parts of epoxy resin A, 600 parts of epoxy resin A–3, 70 parts of epoxy resin B, and 132 parts of guanamine A was "B staged" at 150° C. for 60 minutes at which point the reaction product had a viscosity of 1200 centipoises at 150° C. The cooled product had an oxirane oxygen content of 2.9% and a melting point of 92.5° C. The resin was finely divided and 2% by weight of Cab-O-Sil "M–5" was blended into the ground resin. A fluidized bed of this powder gave a coating on steel which had a General Electric impact resistance of greater than 2% on a ten mil film.

The thermosetting coating powders of the present invention may be used to coat a wide variety of plain, irregular, and complex shaped articles made from various materials. Such articles may include, for instance, electrical insulators, bolts, pins, metal sheets, tubular sleeves, pipes, hooks, sieves, screens, gears, switches, bellows, and innumerable other articles of greater or lesser complexity of shape. The articles may be made of various metals such as steel, iron, aluminum, copper, zinc, and the like, as well as of alloys of said metals. Articles made from non-metallic materials such as glass, plastics, ceramics, and the like, may also be coated with the powders.

It is to be understood that the invention is not to be limited to the exact details of operation or the exact compositions shown or described, as obvious modifications and equivalents will be apparent to those skilled in the art and the invention is to be limited only by the scope of the appended claims. The embodiments of the invention in which an exclusive property or privilege is claimed are defined as follows:

1. A thermosetting coating powder comprising a finely divided, solid, partial reaction product of (1) at least one epoxy resin having terminal epoxide groups and (2) a curing agent consisting essentially of a fatty guanamine having the formula $$(A)_xB$$

where A is the ring

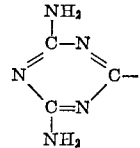

$x$ is a whole integer of 1 to 2 and B is selected from the group consisting of R, $RNHCH_2CH_2$—, $$RN(CH_2CH_2-)_2$$

and $R_1$ where R is an aliphatic hydrocarbon group containing from 4 to 21 carbon atoms and $R_1$ is the hydrocarbon group of dimerized unsaturated fatty acids of 5 to 22 carbon atoms, said guanamine being used in an amount sufficient to cure the epoxy resin to an infusible and insoluble polymer and said partial reaction product being capable of melting and self curing on heating.

2. The powder of claim 1 wherein the ratio by weight of the guanamine and the epoxy resin in the partial reaction product is about 5:95 to 75:25.

3. The powder of claim 1 in which the reaction is 15 to 50% complete.

4. The powder of claim 1 wherein the finely divided partial reaction product has a particle size range of from about 50 to 200 microns.

5. The powder of claim 1 which also contains a flow control and anti-caking agent.

6. The powder of claim 5 wherein said flow control and anti-caking agent is blended with the finely divided, partial reaction product.

7. The powder of claim 5 wherein said flow control and anti-caking agent is added to the mixture of epoxy resin and fatty guanamine prior to the preparation of the reaction product.

8. The powder of claim 5 wherein said flow control and anti-caking agent is selected from the group consisting of synthetic amorphous silicas and natural silicates.

9. The powder of claim 8 wherein said flow control and anti-caking agent is a synthetic amorphous silica having a $SiO_2$ content of at least 98%, a pH of 6–8, a particle size of 3–5 microns, and a density of about 8.9 lbs./cu. ft.

10. The powder of claim 5 wherein said flow control and anti-caking agent is present in an amount of from about 2 to 50% by weight.

11. The powder of claim 1 which also contains about 1 to 15% by weight of a material selected from the group consisting of heat resistant pigments and colorants.

12. The powder of claim 5 which also contains about 1 to 15% by weight of material selected from the group consisting of a heat resistant pigment and colorants.

13. The powder of claim 1 wherein the fatty guanamine has the formula:

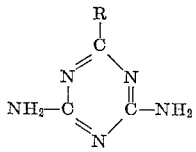

where R is an aliphatic hydrocarbon group containing from 4 to 21 carbon atoms.

14. The powder of claim 1 wherein the epoxy resin has an epoxy equivalent weight of from about 140 to 2000.

15. The powder of claim 1 wherein the epoxy resin is a polyglycidyl ether of a polyhydric phenol.

16. The powder of claim 1 wherein the epoxy resin is a diglycidyl ether of a polyalkylene glycol.

17. The powder of claim 1 wherein the epoxy resin is a polyglycidyl ether of bis(p-hydroxyphenyl)sulfone.

18. The powder of claim 1 wherein the epoxy resin is a polyglycidyl ether of a tetraphenol alkane.

19. The powder of claim 1 wherein the epoxy resin is a glycidyl ester of polymeric fat acids.

20. The powder of claim 1 wherein the epoxy resin is an epoxidized novolac resin.

21. The powder of claim 1 wherein the partial reaction product is prepared from a mixture of at least two epoxy resins.

22. The powder of claim 1 wherein the partial reaction product is prepared from a mixture of a solid and a liquid epoxy resin.

23. The powder of claim 22 wherein the solid and liquid epoxy resins are polyglycidyl ethers of a polyhydric phenol.

24. The powder of claim 23 which also contains a flow control and anti-caking agent.

References Cited by the Examiner

UNITED STATES PATENTS

| | | | |
|---|---|---|---|
| 2,459,710 | 6/49 | Mackay | 260—249.9 |
| 2,768,992 | 10/56 | Fukas | 260—47 |
| 2,928,811 | 3/60 | Belanger | 260—47 |
| 3,028,251 | 4/62 | Nagel | 117—21 |
| 3,063,965 | 11/62 | Colclough | 260—47 |
| 3,102,823 | 9/63 | Manasia et al. | 117—161 |

RICHARD D. NEVIUS, *Primary Examiner.*